US012720483B2

(12) United States Patent
Ghinamo et al.

(10) Patent No.: US 12,720,483 B2
(45) Date of Patent: Aug. 25, 2026

(54) METHOD AND SYSTEM FOR DETERMINING INDOOR LOCATIONS OF USER DEVICES WITHIN A CELLULAR NETWORK

(71) Applicant: Telecom Italia S.p.A., Milan (IT)

(72) Inventors: Giorgio Ghinamo, Turin (IT); Davide Micheli, Rome (IT)

(73) Assignee: TELECOM ITALIA S.P.A., Milan (IT)

( * ) Notice: Subject to any disclaimer, the term of this patent is extended or adjusted under 35 U.S.C. 154(b) by 257 days.

(21) Appl. No.: 18/577,712

(22) PCT Filed: Jul. 11, 2022

(86) PCT No.: PCT/EP2022/069236
§ 371 (c)(1),
(2) Date: Jan. 9, 2024

(87) PCT Pub. No.: WO2023/285341
PCT Pub. Date: Jan. 19, 2023

(65) Prior Publication Data

US 2024/0349237 A1 Oct. 17, 2024

(30) Foreign Application Priority Data

Jul. 12, 2021 (IT) ........................ 102021000018233

(51) Int. Cl.
*H04W 64/00* (2009.01)
*H04W 24/10* (2009.01)

(52) U.S. Cl.
CPC ......... *H04W 64/006* (2013.01); *H04W 24/10* (2013.01)

(58) Field of Classification Search
CPC ... H04W 64/006; H04W 24/10; H04W 4/027; H04W 4/33; H04W 4/46; H04W 4/029
See application file for complete search history.

(56) References Cited

U.S. PATENT DOCUMENTS

| | | | | |
|---|---|---|---|---|
| 10,356,562 | B2 * | 7/2019 | Le Grand | G01C 21/206 |
| 10,492,023 | B1 * | 11/2019 | Gurin | H04W 4/021 |
| 2014/0256346 | A1 * | 9/2014 | Venkatraman | H04W 4/33 455/456.1 |
| 2019/0223138 | A1 * | 7/2019 | Ronen | H04W 64/00 |
| 2020/0396710 | A1 * | 12/2020 | Wigren | H04W 24/10 |
| 2021/0211839 | A1 * | 7/2021 | Lee | H04W 4/021 |

OTHER PUBLICATIONS

International Search Report and Written Opinion mailed on Oct. 6, 2022, received for PCT Application PCT/EP2022/069236, filed on Jul. 11, 2022, 10 pages.

* cited by examiner

*Primary Examiner* — Angelica Perez
(74) *Attorney, Agent, or Firm* — XSENSUS LLP

(57) ABSTRACT

A method and system for determining, based on event tracing associated with user devices connected to a cellular network, locations of the user devices in indoor environments (hereinafter, indoor locations), for example in order to determine quality of service maps of (e.g., urbanized) indoor environments of a geographic area covered by the cellular network.

20 Claims, 2 Drawing Sheets

Figure 1:
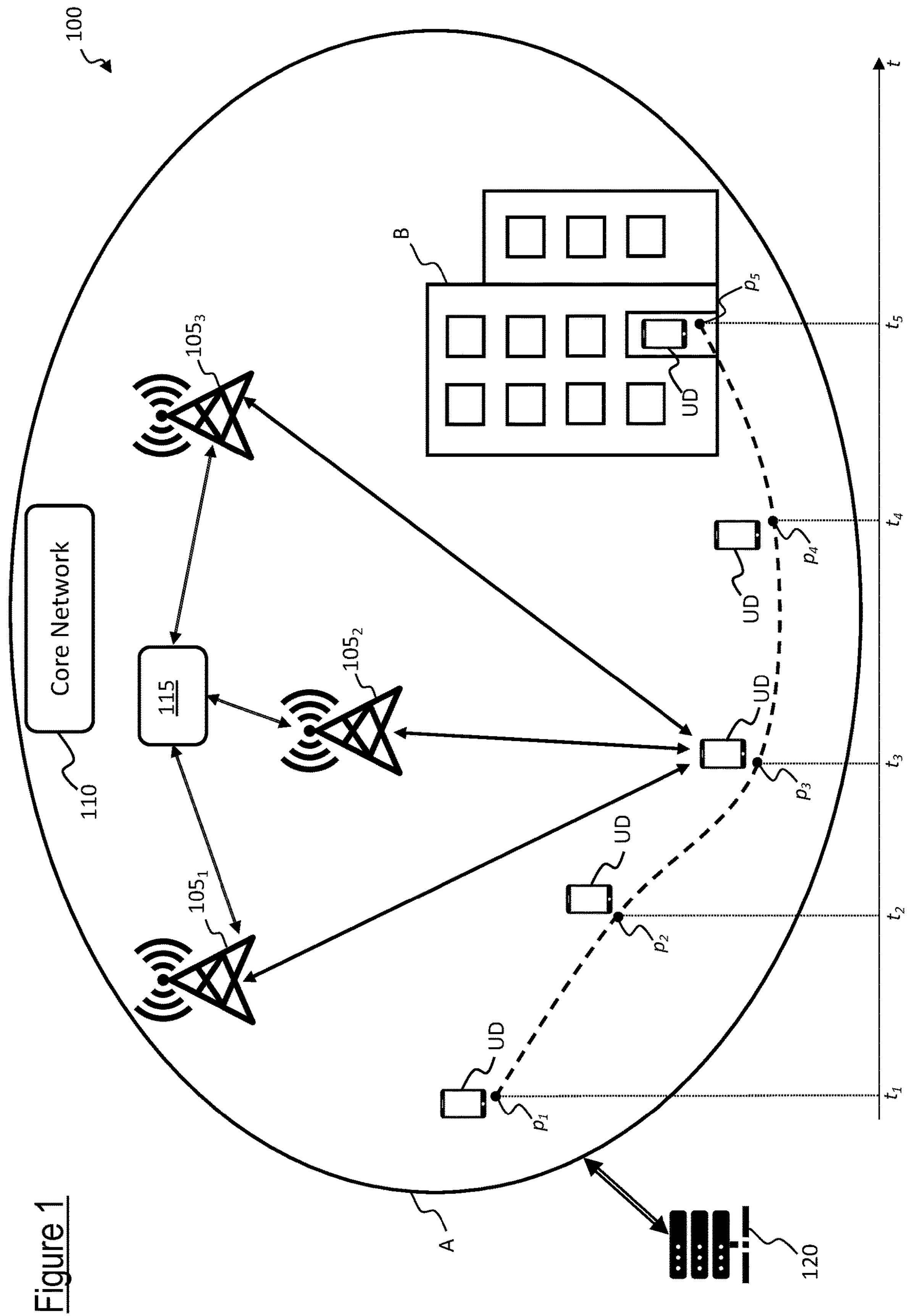

100
Core Network
110
115
$105_1$
$105_2$
$105_3$
B
UD
UD
UD
UD
UD
$p_1$
$p_2$
$p_3$
$p_4$
$p_5$
$t_1$
$t_2$
$t_3$
$t_4$
$t_5$
t
A
120

METHOD AND SYSTEM FOR DETERMINING INDOOR LOCATIONS OF USER DEVICES WITHIN A CELLULAR NETWORK

CROSS-REFERENCE TO RELATED APPLICATIONS

The present application is based on PCT filing PCT/EP2022/069236, filed Jul. 11, 2022, which claims priority from Italian Patent Application No. 102021000018233, filed Jul. 12, 2021, the entire contents of each are incorporated herein by reference.

BACKGROUND OF THE INVENTION

Field of the Invention

The present invention relates to a method and system for determining, based on event tracing associated with user devices connected to a cellular network, locations of the user devices in indoor environments (hereinafter, indoor locations), for example in order to determine quality of service maps of (e.g., urbanized) indoor environments of a geographic area covered by the cellular network.

Overview of the Related Art

A cellular network generally provides radio coverage over a respective geographic area.

As known, a quality of service of the geographic area may be properly determined based on georeferenced event tracing associated with user devices (such as smartphones) connected to the cellular network.

Examples of event tracing comprise measurements performed and reported (to the cellular network) by the user devices (hereinafter, tracing measurements). The tracing measurements may for example be reported by the user devices through the "Minimization of Drive Test" (MDT) functionality.

Examples of georeferenced event tracing comprise the tracing measurements combined with positioning information. The positioning information may for example be determined by exploiting georeferencing functionalities of the user devices (e.g., georeferencing functionalities based on satellite ranging techniques, such as GPS and/or GNSS/A-GNSS hereinafter techniques, satellite georeferencing functionalities), and/or by exploiting georeferencing functionalities of the cellular network (e.g., georeferencing functionalities based on terrestrial ranging techniques, hereinafter terrestrial georeferencing functionalities).

In practical scenarios, the geographic area typically comprises outdoor environments (such as free spaces) and indoor environments (such as buildings).

As known, especially when the user devices are located within indoor environments, the respective tracing measurements may be associated with no positioning information or with invalid positioning information, e.g. due to complete or partial electromagnetic radiation shielding of the buildings: this makes determination of locations of user devices in indoor environments inaccurate.

In addition, a relatively high number of user devices do not support the satellite georeferencing functionalities combined with the tracing measurements (e.g., due to manufacturer restrictions), and no terrestrial georeferencing functionality may be deployed in the cellular networks (e.g., due to network operator restrictions), whereby the respective tracing measurements may be associated with no positioning information whether these user devices are located in indoor environments or in outdoor environments.

US20150097731 discloses a portable communication device and a method for determining indoor or outdoor location of the device. The method includes measuring a signal strength of at least one of a location service signal, a RAN signal, and a small coverage area signal that is detectable within a current location of the portable communication device, comparing signal strength to corresponding pre-established signal strength threshold, and obtaining contextual information by accessing sensor data from at least one sensor selected based on a result of the comparing. The method also includes configuring the portable communication device for operation within an outdoor space in response to determining that the portable communication device is transitioning from the indoor space to the outdoor space and configuring the portable device for operation within an indoor space in response to determining the portable device is transitioning from the outdoor space to the indoor space.

Paper "*A Data-driven Algorithm for Indoor/Outdoor Detection Based on Connection Traces in a LTE Network*", IEEE Access (Volume: 7), Pages 65877-65888, 23 May 2019, by Juan L. Bejarano-Luque et al., proposes a data-driven statistical model to detect if a cellular connection is originated in an indoor location based on the traffic attributes of the connection. The proposed model is developed by logistic regression on data from radio connection traces stored in the network management system.

EP2270535 discloses an indoor/outdoor decision apparatus for making an indoor/outdoor decision on whether a mobile communication terminal is located indoors or outdoors, which has: a communication information acquiring unit which acquires communication information about wireless communication at the mobile communication terminal; an environment information acquiring unit which acquires environment information indicative of an environment associated with the mobile communication terminal; a criterion setting unit which sets a criterion for the indoor/outdoor decision according to the environment information; and a deciding unit which makes the indoor/outdoor decision with reference to the communication information on the basis of the set criterion.

SUMMARY OF INVENTION

The Applicant has found that the solutions known in the art are not satisfactory.

As far as US20150097731 is concerned, the corresponding solution does not allow determining indoor or outdoor locations of the user devices in the practical scenarios of tracing measurements associated with no positioning information or with invalid positioning information.

Concerning paper "*A Data-driven Algorithm for Indoor/Outdoor Detection Based on Connection Traces in a LTE Network*" and EP 2 270 535, the corresponding solutions are unreliable in association with event tracing in that the measurements performed by the user devices during a same communication session are considered as uncorrelated to each other (and, hence, no context/behavior analysis is performed to discriminate outdoor locations from indoor locations).

The Applicant has faced the issue of discriminating between indoor and outdoor locations of the user devices in the practical scenario in which a plurality of tracing measurements are available for each communication session, and in which, among the available tracing measurements, tracing measurements associated with no positioning information or with invalid positioning information are provided, and has devised a method and system for determining accurate indoor locations of user devices connected to a cellular network in such a practical scenario.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method. The method may comprise receiving, from a cellular network, measurements performed by user devices connected to the cellular network. The method may comprise identifying, among the measurements, a plurality of measurement sequences each one associated with a respective user device; each measurement sequence may comprise the measurements performed by the associated user device in chronological order. The method may comprise, e.g. for each measurement sequence, determining position estimates of positions taken by the associated user device when performing the measurements of that measurement sequence. The method may comprise, for each measurement sequence, determining an average speed estimate of the associated user device based on the respective position estimates. The method may comprise determining, among the plurality of measurement sequences, first measurement sequences, the first measurement sequences comprising the measurement sequences, among the plurality of measurement sequences, for which the respective average speed estimates of the associated user devices are below a threshold speed. The method may comprise determining, e.g. among the first measurement sequences, second measurement sequences each one comprising at least one indoor measurement; the at least one indoor measurement of each second measurement sequence may comprise at least one measurement, among the measurements of that second measurement sequence, that is associated with no positioning information or with an invalid positioning information. The method may comprise, for each second measurement sequence, determining an indoor location associated with the respective at least one indoor measurement; said determining an indoor location may comprise refining the position estimate associated with the at least one indoor measurement.

According to an embodiment, whose features are additional or alternative to any feature of any previous embodiment, the second measurement sequences comprise the measurement sequences, among the first measurement sequences, for which the at least one indoor measurement is in a predefined relationship with a reference measurement.

According to an embodiment, whose features are additional or alternative to any feature of any previous embodiment, for each second measurement sequence, the at least one indoor measurement comprises an indoor measurement associated with a serving network cell.

According to an embodiment, whose features are additional or alternative to any feature of any previous embodiment, for each second measurement sequence, the at least one indoor measurement further comprises a set of indoor measurements each one associated with a respective adjacent network cell being adjacent to the serving network cell.

According to an embodiment, whose features are additional or alternative to any feature of any previous embodiment, said reference measurement is based on at least one among:

- indoor expected powers, for example indoor expected powers determined based on theoretical models of electromagnetic propagation;
- outdoor average powers, for example outdoor average powers determined based on located measurements, among said measurements performed by the user devices, that are associated with valid positioning information;
- outdoor expected powers, for example outdoor expected powers determined based on electromagnetic simulations.

According to an embodiment, whose features are additional or alternative to any feature of any previous embodiment, said determining an average speed estimate is based on a smoothing technique, such as a smoothing technique based on Kalman filtering, low-pass filtering or moving average.

According to an embodiment, whose features are additional or alternative to any feature of any previous embodiment, for each measurement sequence, the threshold speed depends on an accuracy of the respective position estimates, and/or on a duration of a communication session during which the respective measurements have been performed.

According to an embodiment, whose features are additional or alternative to any feature of any previous embodiment, said determining position estimates is based on Enhanced Cell ID positioning techniques.

According to an embodiment, whose features are additional or alternative to any feature of any previous embodiment, said measurements comprise timing advance measurements. Said determining an indoor location associated with the respective at least one indoor measurement may be based:

- if the at least one indoor measurement is associated with two or more timing advance measurements, on said two or more timing advance measurements, or
- if the at least one indoor measurement is associated with a single timing advance measurement, on an average position estimate resulting from a smoothing of the respective position estimate.

According to an embodiment, whose features are additional or alternative to any feature of any previous embodiment, said determining an indoor location of the respective at least one indoor measurement is based on a last available valid positioning information before the at least one indoor measurement has been performed.

According to an embodiment, whose features are additional or alternative to any feature of any previous embodiment, said identifying, among the measurements, a plurality of measurement sequences is based on "International Mobile Subscriber Identity" numbers associated with the user devices, or on at least one between session identifiers and "Temporary Mobile Subscriber Identity" associated with the user devices.

According to an embodiment, whose features are additional or alternative to any feature of any previous embodiment, the method further comprises, based on the determined indoor locations, providing quality-of-service maps for indoor environments within the geographic area, and/or setting one or more parameters of the cellular network by exploiting "Self-Organizing Network" functionalities of the cellular network.

Another aspect of the present invention relates to a location processing module configured to perform the method of above (or a part thereof). The location processing module may be configured to receive, from a cellular network, measurements performed by user devices connected to the cellular network. The location processing module may be configured to identify, among the measurements, a plurality of measurement sequences each one associated with a respective user device, each measurement sequence comprising the measurements performed by the associated user device in chronological order. The location processing module may be configured to, for each measurement sequence, receive, from the cellular network, position estimates of positions taken by the associated user device when performing the measurements of that measurement sequence. The location processing module may be configured to, for each measurement sequence, determine an average speed estimate of the associated user device based on the respective position estimates. The location processing module may be configured to determine, among the plurality of measurement sequences, first measurement sequences, the first measurement sequences comprising the measurement sequences, among the plurality of measurement sequences, for which the respective average speed estimates of the associated user devices are below a threshold speed. The location processing module may be configured to determine, among the first measurement sequences, second measurement sequences each one comprising at least one indoor measurement; the at least one indoor measurement of each second measurement sequence may comprise at least one measurement, among the measurements of that second measurement sequence, that is associated with no positioning information or with an invalid positioning information. The location processing module may be configured to, for each second measurement sequence, determine an indoor location associated with the respective at least one indoor measurement; said determining an indoor location may comprise refining the position estimate associated with the at least one indoor measurement.

Another aspect of the present invention comprises a system. The system comprises the location processing module and the cellular network.

BRIEF DESCRIPTION OF THE ANNEXED DRAWINGS

Figure 2:
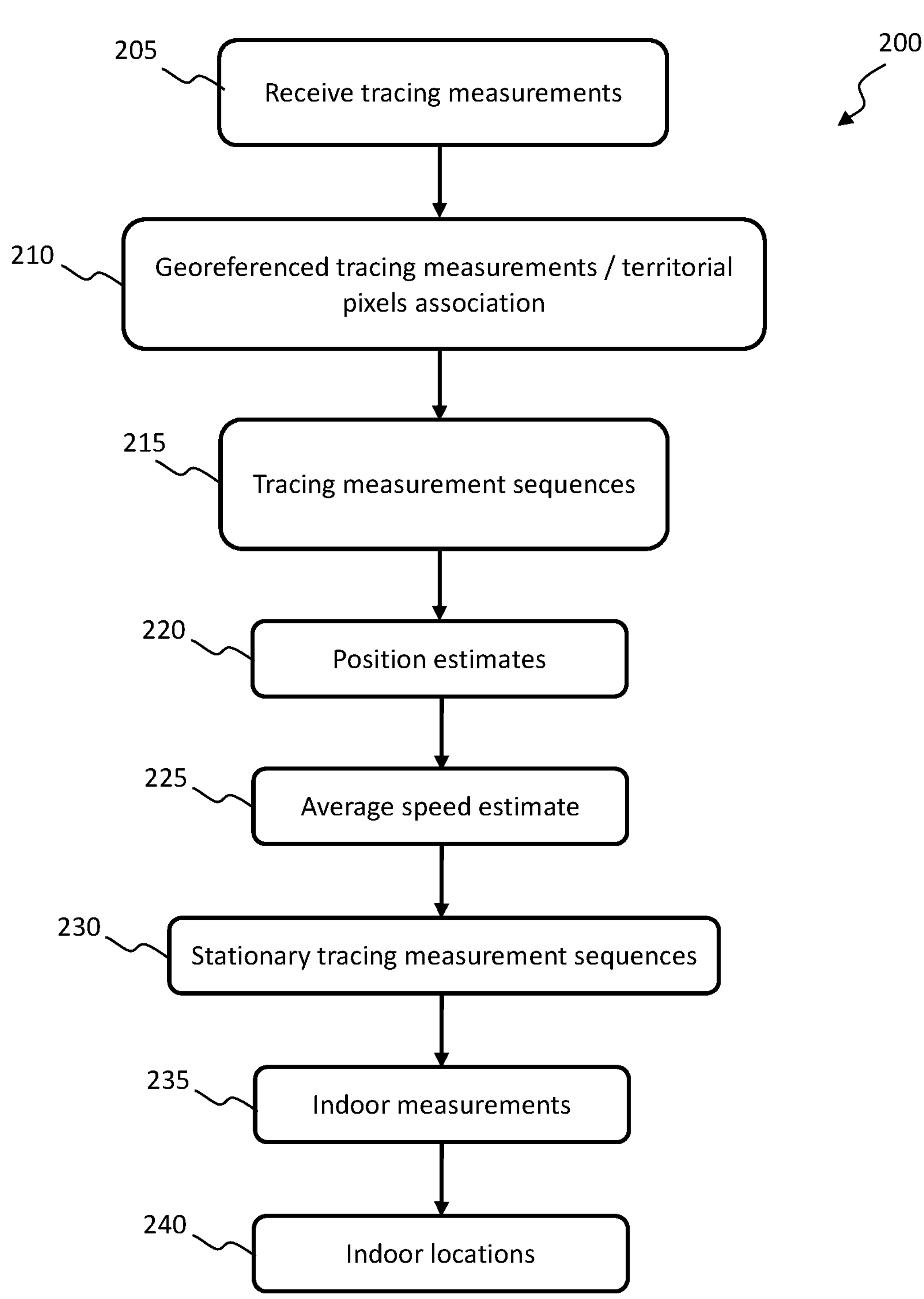

These and other features and advantages of the present invention will be made apparent by the following description of some exemplary and non-limitative embodiments thereof. For its better intelligibility, the following description should be read making reference to the attached drawings, wherein:

FIG. 1 shows a system according to an embodiment of the present invention, and FIG. 2 shows a method according to an embodiment of the present invention.

DETAILED DESCRIPTION OF PREFERRED EMBODIMENTS OF THE INVENTION

With reference to the drawings, FIG. 1 shows a system 100 according to an embodiment of the present invention.

In the following, only features of the system 100 that are deemed relevant for the understanding of the present invention will be discussed, with well-known and/or obvious variants of the relevant features that are omitted for the sake of conciseness.

In the following, when one or more features of the system 100 are introduced by the wording "according to an embodiment", they are to be construed as features additional or alternative to any features previously introduced, unless otherwise indicated and/or unless there is evident incompatibility among feature combinations.

According to an embodiment, the system 100 comprises a cellular network. According to an embodiment, the cellular network provides radio coverage over a geographic area A.

According to an embodiment, the cellular network comprises a plurality of cellular communication equipment 105; (i=1, 2, . . . , I). For ease of illustration, only cellular communication equipment $\mathbf{105}_1$,$\mathbf{105}_2$,$\mathbf{105}_3$ are depicted in FIG. 1 (i.e., I=3 in the example at issue). According to an embodiment, each cellular communication equipment $\mathbf{105}_i$ is configured to provide radio coverage over (or, equivalently, is associated with) one or more portions of the geographic area A, or network cells (not shown).

Considering, just as an example, circular or approximately circular network cells, each network cell may have a radius of the order of a few hundred meters (for example, 300 m) in urban environments, or a radius of the order of a few kilometers (for example, 3 km) in extra-urban environments.

According to an embodiment, each cellular communication equipment $\mathbf{105}_i$ may be associated with a respective network cell, or with a plurality of network cells (such as three network cells), not shown.

According to an embodiment, the cellular communication equipment $\mathbf{105}_i$ allow user devices within the respective network cells (and connecting/connected to the cellular network) to establish communication sessions (such as web browsing, voice/video call sessions). The user devices may for example comprise personal devices owned by users of the cellular network (the users being for example subscribers of services offered by the cellular network). Examples of user devices comprise, but are not limited to, mobile phones, smartphones, tablets, personal digital assistants and computers. For the purposes of the present disclosure, the user devices are not part of the cellular network (and, more generally, the user devices are not part of the system 100).

In FIG. 1, a single user device UD is shown for ease of illustration. In the exemplary considered scenario, the user device UD is a user device that has established a communication session (for example, a voice call session) with the cellular network, and that is moving within the geographic area A during the communication session.

In FIG. 1, the exemplary scenario is depicted in which the user device UD, during the communication session, takes, over time t, a plurality of positions $p_j$ (j=1, 2, . . . , J, with J=5 in the example at issue) within the geographic area A. In the exemplary depicted scenario, positions $p_1$ to $p_4$ correspond to outdoor positions of the user device UD, i.e. with the user device UD that is located in an outdoor environment (such as a free space) within the geographic area A. In the exemplary depicted scenario, position $p_5$ corresponds to an indoor position of the user device UD, i.e. with the user device UD that is located in an indoor environment within the geographic area A. For the purposes of the present disclosure, by indoor environment it is herein meant the interior of a building, such as the exemplary illustrated building B within the geographic area A (the building B being not part of the system 100). For the purposes of the present disclosure, the building B may be any walled structure built for permanent or substantially permanent use. Just as an example, the building B may be a roofed structure (such as a residential or commercial building), or a roofless structure (such as a stadium for sport or music events).

As visible in the figure, each position $p_j$ is taken by the user device UD at a respective time instant $t_j$. For the purposes of the present disclosure, each time instant $t_j$, and hence the position $p_j$ taken by the user device UD at that time instant $t_j$, is associated with respective measurements performed by the user device UD at that time instant $t_j$ (as better discussed in the following).

In the following, a time duration of the communication session will be also referred to as session duration. In the considered example, the session duration spans over time from time instant $t_1$ to time instant $t_5$—however, without losing generality, time instant $t_1$ to time instant $t_5$ may identify a portion (e.g., a selected portion) of the communication session.

According to an embodiment, the cellular communication equipment 105; form the radio access network.

The radio access network (and, more generally, the cellular network) may be based on any suitable radio access technology. Examples of radio access technologies include, but are not limited to, UTRA ("UMTS Terrestrial Radio Access"), WCDMA ("Wideband Code Division Multiple Access"), CDMA2000, LTE ("Long Term Evolution"), LTE-Advanced, and NR ("New Radio"). Depending on the radio access technology on which the radio access network is based, the cellular communication equipment 105$_i$ may be referred to as the node B (e.g., UTRA radio access technology) eNodeB (e.g., LTE/LTE-Advanced radio access technology), or GNodeB (e.g., 5G radio access technology).

According to an embodiment, the cellular network comprises one or more core networks, such as the core network 110. According to an embodiment, the core network 110 is communicably coupled to the radio access network. According to an embodiment, the core network 110 may be any type of network configured to provide aggregation, authentication, call control/switching, charging, service invocation, gateway and subscriber database functionalities, or at least a subset (i.e., one or more) thereof.

According to an embodiment, the core network 110 may be communicably coupled with other networks, such as the Internet and/or public switched telephone networks (not shown).

According to an embodiment, the cellular network is configured to determine position estimates of the user devices.

According to an embodiment, the cellular network is configured to determine position estimates of the user devices based on Enhanced Cell ID positioning techniques.

According to Enhanced Cell ID positioning technique principles, the cellular network is configured to determine position estimates of the user devices based on event tracing associated with the user devices.

In the exemplary considered embodiment, event tracing comprise measurements performed by the user devices (hereinafter, tracing measurements).

According to an embodiment, the tracing measurements performed by the user devices are reported to the cellular network by the user devices connected thereto.

According to an embodiment, the measurements may for example be reported to an "Operations Support System" (OSS) module 115 of the cellular network, or to any other network entity of, or residing in, the cellular network.

According to an embodiment, the OSS module 115 is configured to manage event tracing and position estimates of the user devices.

According to embodiment, the tracing measurements are reported by the user devices through "Minimization of Drive Test" (MDT) functionality (although this should not be construed limitatively).

According to embodiment, a subset of the tracing measurements is reported by the user devices through MDT functionality. According to an embodiment, the subset of the tracing measurements reported by the user devices through MDT functionality comprise the tracing measurements that do not contain user personal data (such as the tracing measurements included in the "Measurement Report"), e.g. so as to meet user privacy requirements.

Examples of tracing measurements (or of the subset of the tracing measurements) include, but are not limited to, time measurements (such as TA ("Timing Advance") measurements, and "Rx-Tx time difference" measurements), and power measurements (such as RSRP ("Received Signal Received Power") measurements, and RSRQ ("Received Signal Received Quality") measurements).

According to an embodiment, for each user device, the tracing measurements may comprise both measurements associated with a respective serving network cell (i.e., the network cell identified by the cellular communication equipment 105; that is actually serving that user device), and measurements associated with respective adjacent network cells being adjacent to the serving network cell: this is conceptually represented in the figure by bidirectional arrows between the user device UD and each cellular communication equipment 105. For ease of representation, only tracing measurements performed at time instant $t_3$ (and, hence, associated with position $p_3$) are illustrated, it being understood that tracing measurements performed at each j-th time instant $t_j$ (and, hence, associated with each j-th position $p_j$) are provided in the considered embodiment.

According to an embodiment, the cellular network (e.g., the OSS module 115), based on the Enhanced Cell ID positioning techniques, is configured to determine position estimates of the user devices based on one or more among the tracing measurements. According to an embodiment, the cellular network is configured to determine position estimates of the user devices based on one or more among the power measurements and on one or more among the time measurements. In the exemplary considered embodiment, the cellular network is configured to determine position estimates of the user devices based on the RSRP measurements and the TA measurements. In the exemplary considered embodiment, the cellular network (e.g., the OSS module 115) is configured to determine position estimates of the user devices based on the RSRP measurements and the TA measurements associated with respective serving network cells, and on the RSRP measurements associated with respective adjacent network cells (as better discussed in the following).

According to an embodiment, the cellular network (e.g., the OSS module 115), based on the Enhanced Cell ID positioning techniques, is configured to determine position estimates of the user devices based on center of gravity of serving network cells (usually referred to as Cell ID positioning techniques) and on the tracing measurements, and, optionally, based on comparisons between the tracing measurements (or a subset thereof) and respective reference measurements (as better discussed in the following). The reference measurements may for example be based on theoretical models of electromagnetic propagation (such as, the Okumura-Ata propagation model, or the ray-tracing propagation model), optionally taking into account physical obstacles mapped in tridimensional (3D) topographic maps.

According to an embodiment, the position estimates of the user devices based on the tracing measurements are determined by the OSS module 115, or by any other network entity of, or residing in, the cellular network.

According to an embodiment, the tracing measurements may be associated with (e.g., they may include) positioning information. According to an embodiment, the positioning information may be determined by exploiting satellite georeferencing functionalities of the user devices (i.e., georeferencing functionalities based on satellite ranging techniques, such as GPS and/or GNSS/A-GNSS techniques) and/or by exploiting terrestrial georeferencing functionalities of the cellular network (i.e., georeferencing functionalities based on terrestrial ranging techniques).

In practical scenarios, at a j-th time instant, no positioning information or invalid positioning information may be associated with the respective tracing measurements. By invalid positioning information it is herein meant a positioning information not allowing the respective user device to be located or georeferenced within the geographic area A with a predefined minimum accuracy (as opposed to valid positioning information, which is herein meant as positioning information allowing the respective user device to be located or georeferenced within the geographic area A with the predefined minimum accuracy).

Tracing measurements associated with no positioning information or with invalid positioning information may typically (although not exclusively) arise when the user devices are located in indoor environments (such as in buildings), e.g. due to complete or partial electromagnetic radiation shielding of the buildings.

Tracing measurements associated with no positioning information may typically (although not exclusively) arise when the user devices do not support the satellite georeferencing functionalities or (e.g., due to manufacturer restrictions) when the user devices do not support the satellite georeferencing functionalities in combination with the tracing measurements.

Tracing measurements associated with no positioning information may typically (although not exclusively) arise when the cellular network does not support the terrestrial georeferencing functionalities.

Tracing measurements associated with valid positioning information may typically (although not exclusively) arise when the user devices supporting the georeferencing functionalities are located in outdoor environments.

In the following, tracing measurements associated with valid positioning information will be referred to as georeferenced tracing measurements, whereas tracing measurements associated with no positioning information or with invalid positioning information will be referred to as not-georeferenced tracing measurements.

According to an embodiment, the system 100 comprises a location processing module (hereinafter concisely referred to as LP module) 120.

According to an embodiment, the LP module 120 is located external to the cellular network. According to alternative embodiments, the LP module 120 is located in the core network 110 (e.g., in one or more modules thereof), in one or more of the cellular communication equipment $\mathbf{105}_i$, and/or in any other network entity of, or residing in, the cellular network.

According to an embodiment, the LP module 120 is communicably coupled to the OSS module 115. According to an embodiment, the LP module 120 is configured to receive, from the OSS module 115, the tracing measurements and the position estimates.

According to an embodiment, the LP module 120 is configured to determine indoor locations of the user devices connected to the cellular network.

According to an embodiment, the indoor locations of the user devices connected to the cellular network may for example be used (e.g., by the LP module 120 or by any other entity or module external or internal to the cellular network) to provide quality-of-service maps for indoor environments within the geographic area A (hereinafter, indoor QoS maps), i.e. maps locating the indoor environments and one or more quality-of service parameters associated therewith. Examples of quality-of-service parameters comprise, but are not limited to, signal level, traffic volume and events. Just as an example, the QoS maps may be used for cellular network planning and/or design, e.g. for identifying suitable positions of the cellular communication equipment within the geographic area A. Just as another example, the QoS maps may be used for statistical data processing, e.g. for commercial purposes.

According to an embodiment, the indoor locations of the user devices connected to the cellular network may for example be used to allow setting, tuning or adjusting (e.g., by exploiting "Self-Organizing Network" (SON) functionalities of the cellular network) one or more parameters of the cellular network, e.g. in order to compensate for low power levels associated with the indoor locations, and/or to provide traffic redistribution over the network cells.

According to an embodiment, the LP module 120 is configured to provide the indoor QoS maps based on the tracing measurements (or at least a subset thereof), as better discussed in the following.

With reference to FIG. 2, it schematically shows, according to an embodiment of the present invention, an activity diagram of a method 200 for determining the indoor locations of the user devices.

According to an embodiment, the method 200 is performed by the LP module 120. However, this should not be construed limitatively: in fact, according to an embodiment, at least a subset of the method steps may be implemented by the core network 110, and/or by one or more other network entities (not shown) of, or residing in, the cellular network (such as the OSS module 115).

According to an embodiment, the method 200 comprises, at the LP module 120, receiving (e.g., from the OSS module 115) the tracing measurements from the cellular network (action node 205).

According to an embodiment, the tracing measurements received at the LP module 120 comprise the tracing measurements performed by the user devices during a predetermined time period (for example, of the order of one or more days).

According to an embodiment, the method 200 comprises associating the georeferenced tracing measurements with respective territorial portions (hereinafter, territorial pixels) of the geographic area A (action node 210).

According to an embodiment, each territorial pixel is identified by latitude and longitude coordinates. According to an embodiment, each territorial pixel represents a small or relatively small portion of the geographic area A. Just as an example, each territorial pixel may have a size of approximatively 50 m×50 m in extra-urban scenarios, and of approximatively 10 m×10 m in urban scenarios.

As a result of the association between the georeferenced tracing measurements and the territorial pixels, each territorial pixel may be associated with a plurality of georeferenced tracing measurements performed by a plurality of user devices.

According to an embodiment, the association between the georeferenced tracing measurements (and, particularly, the georeferenced power measurements) and the territorial pixels may be used to determine, for each territorial pixel, a corresponding outdoor average power (indeed, the georeferenced power measurements are associated with valid positioning information, and the valid positioning information typically arises when the user devices are located in outdoor environments). As better discussed in the following, the outdoor average power for (or within) each territorial pixel may in turn be used to identify outdoor-indoor transitions (or, more generally, indoor measurements) in that territorial pixel.

According to an embodiment, the association between the georeferenced tracing measurements and the territorial pixels (and, when provided, determination of the outdoor average powers within the territorial pixels) is performed at the LP module 120. In alternative embodiments, the association between the georeferenced tracing measurements and the territorial pixels (and, when provided, determination of the outdoor average powers within the territorial pixels) may be at least partially performed at the cellular network.

According to an embodiment, the method 200 comprises identifying, among the tracing measurements, one or more (preferably, a plurality of) tracing measurement sequences each one associated with a respective user device (action node 215). According to embodiment, each tracing measurement sequence relates to a respective communication session established by the associated user device. Therefore, in this embodiment, for a user device connected to the cellular network and establishing a plurality of (i.e., two or more) communication sessions during the predetermined time period, a plurality of associated tracing measurement sequences may be provided, each one relating to a respective one of the plurality of communication sessions established by that user device during the predetermined time period.

In the example herein considered, the tracing measurement sequence associated with the user device UD comprises the tracing measurements performed by the user device UD at time instant $t_1$ to time instant $t_5$, i.e. while the user device UD, during a corresponding communication session, is moving from position $p_1$ to position $p_5$, respectively.

According to an embodiment, the identification of the tracing measurement sequences is based on IMSI ("International Mobile Subscriber Identity") numbers associated with the user devices, or on any other identifiers uniquely identifying the user devices connected to the cellular network. According to an embodiment, the IMSI numbers may be included in the tracing measurements, although this should not be construed limitatively.

According to an embodiment, in order to avoid identification of the tracing measurement sequences by means of user personal data (such as the IMSI numbers), so as to meet user privacy requirements, the identification of the tracing measurement sequences may be based on one or more anonymous identifiers.

Just as an example, the identification of the tracing measurement sequences may be based on session identifiers associated with the user devices when establishing a communication session. The identification of the tracing measurement sequences based on session identifiers results in tracing measurement sequences extending over temporal durations of the order of a few seconds.

Just as another example, the identification of the tracing measurement sequences may be based on TMSI ("Temporary Mobile Subscriber Identity") numbers allocated to the user devices. According to an embodiment, the TMSI numbers may be included in the tracing measurements, although this should not be construed limitatively. TMSI numbers are typically allocated (e.g., by the core network) to each user device upon occurrence of predetermined events (such as handovers, LA ("Location Area") updates, user device turning on or off, initiation of a communication session). Thus, different TMSI number allocations may take place for each user device during a single communication session, and the tracing measurements (of that communication session) that immediately follow the occurrence of those predetermined events may include the allocated TMSI numbers.

Just as a further example, the identification of the tracing measurement sequences may be based on a correlation between the TMSI numbers and the session identifiers. According to an embodiment, the session identifiers may be included in the tracing measurements, although this should not be construed limitatively.

The identification of the tracing measurement sequences based on the correlation between the TMSI numbers and the session identifiers may comprise, from a tracing measurement associated with a respective TMSI number and a respective session identifier, associating each following tracing measurement containing no TMSI number and having same session identifier with a same user device (and, hence, with a same communication session). Therefore, as a result of the correlation between the TMSI numbers and the session identifiers, tracing measurements containing no TMSI number may be associated with a same user device and with a same communication session established by that user device. As a result of it, tracing measurement sequences extending over temporal durations of the order of 15-30 minutes (or more) may be achieved.

According to an embodiment, each tracing measurement sequence associated with a user device comprises the tracing measurements reported by that user device in chronological order (so that each tracing measurement sequence identifies a corresponding trajectory travelled by the associated user device during the corresponding communication session). According to an embodiment, the chronological order of the tracing measurements of each tracing measurement sequence is based on timing information associated with the tracing measurements. According to an embodiment, the timing information associated with the tracing measurements comprise timestamps added to the tracing measurements.

According to an embodiment, the identification of the tracing measurement sequences is performed at the LP module 120.

According to an embodiment, the method 200 comprises, for each tracing measurement sequence, determining position estimates associated with the tracing measurements of that tracing measurement sequence (or with a selected set of tracing measurements of that tracing measurement sequence, as discussed here below) (action node 220). By position estimate associated with a tracing measurement it is herein meant an estimate of the position taken by the associated user device when performing (i.e., at the time instant the user device has performed) that tracing measurement.

According to an embodiment, the method 200 comprises (at action node 220), for each tracing measurement sequence, determining the position estimate associated with each tracing measurement of a selected set of tracing measurements of that tracing measurement sequence, so as to obtain, for each tracing measurement sequence, a corresponding selected set of position estimates. According to an embodiment, the selected set of tracing measurements of each tracing measurement sequence comprises tracing measurements (e.g., regardless if they are georeferenced tracing measurements or not-georeferenced tracing measurements) performed by the respective user device at time instants spaced over time at regular time intervals, for example of the order to 5-10 seconds. This allows reducing a number of position estimates to be determined by the system 100 (and, particularly, by the cellular network), and hence a computational effort thereof.

According to an embodiment, the position estimates associated with the tracing measurements (or with the selected set of tracing measurements) are determined, for each tracing measurement sequence, for the not-georeferenced tracing measurements (e.g., when that sequence tracing measurement includes only not-georeferenced tracing measurements, for example in case that the corresponding user device does not support the georeferencing functionalities or in case that that the corresponding user device does not support the georeferencing functionalities in combination with the tracing measurements). This allows taking into account tracing measurements performed by user devices not supporting the georeferencing functionalities or by user devices not supporting the georeferencing functionalities in combination with the tracing measurements.

According to an embodiment, the position estimates associated with the tracing measurements (or with the selected set of tracing measurements) are determined, for each tracing measurement sequence, for both georeferenced and not-georeferenced tracing measurements—e.g., when that sequence tracing measurement includes both georeferenced and not-georeferenced tracing measurements, for example in case that the corresponding user device supports georeferencing functionalities and experiences an outdoor-indoor transition (or, more generally, one or more indoor measurements). Determining the position estimates for both georeferenced and not-georeferenced tracing measurements of each sequence tracing measurement allows obtaining consistent types of position data (i.e., the position estimates) for subsequent processing.

According to an embodiment, the position estimates are determined (e.g., based on Enhanced Cell ID positioning techniques) at the cellular network (e.g., at the OSS module 115) and provided to the LP module 120 for subsequent processing.

In alternative embodiments, the position estimates may be determined based on Enhanced Cell ID positioning techniques and/or on Wi-Fi positioning systems (hereinafter, WPS systems). According to WPS systems, characteristics of nearby Wi-Fi hotspots and/or other wireless access points are used to discover where a user device is located.

In the exemplary considered embodiment in which the position estimates are determined based on Enhanced Cell ID positioning techniques, the position estimates may for example be determined based on center of gravity of the serving network cells, and one or more among the tracing measurements (for example, the TA measurements and/or the RSRP measurements).

In the exemplary considered embodiment in which the position estimates are determined based on Enhanced Cell ID positioning techniques, the position estimates are preferably determined based on all among the center of gravity of the serving network cells, the TA measurements, and the RSRP measurements. In this embodiment, an accuracy of the position estimate of the order of ⅓ of the radius of the serving network cell may at most be expected: indeed, the position estimate based on the center of gravity may provide an accuracy approximately equal to an average radius of the serving network cell, the position estimate also based on the TA measurements may provide up to a 60% accuracy increase, and the position estimate further based on the RSRP measurements may provide up to a further 30% accuracy increase. Just as a numerical example, this may translate in an accuracy of the position estimate of about 100 meters in urban scenarios (wherein the radius of the network cells is of the order of a few hundred meters, such as 300 m), and in an accuracy of the position of about 1 km in extra-urban scenarios (wherein the radius of the network cells is of the order of a few kilometers, such as 3 km).

According to an embodiment, the method 200 comprises, for each tracing measurement sequence, determining an average speed estimate of the associated user device based on the respective position estimates (action node 225). According to an embodiment, the average speed estimates are determined at the LP module 120 based on the position estimates determined at the cellular network and received at the LP module 120.

According to an embodiment, the average speed estimate is determined based on a smoothing technique, such as a smoothing technique based on Kalman filtering, low-pass filtering or moving average. According to an embodiment, the average speed estimate is determined for each tracing measurement sequence by applying the smoothing technique on the position estimates associated with that tracing measurement sequence, so as to obtain a corresponding trajectory smoothing and corresponding average position estimates, and hence the corresponding average speed estimate.

According to an embodiment, for each tracing measurement sequence, the average speed estimate is determined based on (e.g., by applying smoothing technique on) a subset of position estimates associated with that tracing measurement sequence. According to an embodiment, the subset of position estimates associated with each tracing measurement sequence comprises estimates of positions taken by the respective user device at time instants spaced over time at regular time intervals, for example of the order of 5-10 seconds.

In embodiments in which, for each tracing measurement sequence, a corresponding selected set of position estimates is determined (action node 220), the subset of position estimates may correspond, for each tracing measurement sequence, to the respective selected set of position estimates or to a subset thereof.

Since, for user devices moving within the geographic area A, the position estimates are affected by statistically-independent errors, the average position estimates resulting from application of the smoothing technique to the position estimates (or to a subset thereof) may feature up to a 30% accuracy increase with respect to the position estimates (and, indeed, as better discussed in the following, according to an embodiment the average position estimates may be used to determine the indoor locations of the user devices).

According to an embodiment, the method 200 comprises determining, among the tracing measurement sequences, the tracing measurement sequences for which the average speed estimates of the associated user devices are below a threshold speed (action node 230).

In the following, the tracing measurement sequences for which the average speed estimates of the associated user devices are below the threshold speed will be concisely referred to as stationary tracing measurement sequences. By stationary tracing measurement sequence, it is herein meant a tracing measurement sequence whose tracing measurements have been performed in a substantially stationary condition of the respective user device with respect to the accuracy of the position estimate. In other words, by stationary tracing measurement sequence, it is herein meant a tracing measurement sequence for which the user device having performed the tracing measurements is a stationary user device with respect to the accuracy of the position estimate.

According to an embodiment, the threshold speed is a speed that may reasonably be associated with vehicular movements or vehicular travels. Just as an example, the threshold speed may be 1 m/s.

According to an embodiment, for each tracing measurement sequence, the threshold speed depends on the accuracy of the respective position estimates, and/or on the session duration (i.e., the time duration of the communication session to which the respective tracing measurements relate).

According to an embodiment, the threshold speed may be set or tuned or adjusted (e.g., for each tracing measurement sequence) based on the accuracy of the position estimate, which in turns depends on a density of the network cells in the geographic area A, and hence on a type of scenario thereof (such as urban or extra-urban scenario).

According to an embodiment, for a tracing measurement sequence, the threshold speed may be set or tuned or adjusted based on the session duration associated with that tracing measurement sequence.

According to an embodiment, as will be better understood from the following numerical examples, the threshold speed may be set or tuned or adjusted (e.g., for each tracing measurement sequence) based on a ratio between the accuracy of the position estimate and the session duration (which ratio essentially defines an uncertainty on the average speed estimate).

Just as an example, in urban scenarios, wherein the accuracy of the position estimate may be considered of about 100 m (as discussed above), a user device that, during a communication session, moves within the geographic area A so as to define a displacement or path or travel equal to or lower than 100 m, may be regarded as a stationary user device (and, hence, the corresponding tracing measurement sequence may be regarded as a stationary tracing measurement sequence).

In urban scenarios, when considering communication sessions having session durations equal to or shorter than 100 seconds(s), an uncertainty on the average speed estimate equal to or higher than 1 m/s is expected. Thus, in urban scenarios, a threshold speed of about 1 m/s would allow effectively discriminating the stationary user devices (and, hence, the stationary tracing measurement sequences). Particularly, in urban scenarios, the stationary tracing measurement sequences may be determined (at action node 230) as the tracing measurement sequences, among the tracing measurement sequences, for which the average speed estimates of the associated user devices are below 1 m/s.

In urban scenarios, when considering communication sessions having session durations longer than 100 s, an uncertainty on the average speed estimate lower than 1 m/s is expected. Thus, a threshold speed lower than 1 m/s would still allow effectively discriminating the stationary user devices (and, hence, the stationary tracing measurement sequences), and a threshold speed lower than 1 m/s may be set. According to an embodiment, in urban scenarios, when considering communication sessions having session durations longer than 100 s, for the same accuracy of the position estimate, the threshold speed may for example be inversely proportional to the average durations of the communication sessions.

Just as another example, in extra-urban scenarios, wherein the accuracy of the position estimate may be considered of about 1 Km (as discussed above), a user device that, during a communication session, moves within the geographic area A so as to define a displacement or path or travel of 1 Km or lower, may be regarded as a stationary user device (and, hence, the corresponding tracing measurement sequence may be regarded as a stationary tracing measurement sequence).

In extra-urban scenarios, communication sessions having session durations equal to or shorter than 100 s would result in an uncertainty on the average speed estimate equal to or higher than 10 m/s. Thus, in extra-urban scenarios, a threshold speed of 1 m/s would not allow effectively discriminating the stationary user devices (and, hence, the stationary tracing measurement sequences). Since, on the other side, in extra-urban scenarios a threshold speed equal to or higher than 10 m/s would not allow excluding a relatively high number of tracing measurement sequences performed during vehicular movements or vehicular travels, and since in extra-urban scenarios the position estimates would be affected by errors statistically correlated in time for stationary user devices, communication sessions having session durations higher than 100 s should be conveniently considered in extra-urban scenarios.

According to an embodiment, the determination of the stationary tracing measurement sequences is performed at the LP module 120, although this should not be construed limitatively.

According to an embodiment, the method 200 comprises identifying, among the stationary tracing measurement sequences, tracing measurement sequences wherein the associated user devices may have experienced outdoor-indoor transitions (action node 235), or, more generally, tracing measurement sequences wherein the associated user devices may have performed indoor measurements.

In the following, outdoor-indoor transition identification will be considered by way of example only. By outdoor-indoor transition it is herein meant a passage of a user device from an outdoor environment to an indoor environment (as illustrated for the user device UD in the exemplary scenario depicted in FIG. 1), or from an indoor environment to an outdoor environment. Otherwise stated, by outdoor-indoor transition it is herein meant a passage of a user device between an outdoor environment and an indoor environment.

In any case, as will be understood from the following discussion, the principles of the present invention equivalently apply to indoor measurement identification.

In the following, the stationary tracing measurement sequences for which outdoor-indoor transitions of the associated user devices are identified will be also referred to as outdoor-indoor tracing measurement sequences.

According to an embodiment, the identification of the outdoor-indoor tracing measurement sequences (or, equivalently, of the outdoor-indoor transitions within the stationary tracing measurement sequences) is performed at the LP module 120, although this should not be construed limitatively.

According to an embodiment, the identification of the outdoor-indoor transitions (or, more generally, of the indoor measurements) comprises determining, for each stationary tracing measurement sequence, that the respective user device has experienced an outdoor-indoor transition (or, more generally, that the respective user device has performed an indoor measurement or has experienced an indoor condition) if, for that stationary tracing measurement sequence, at least one not-georeferenced tracing measurement (e.g., at least one not-georeferenced power measurement) exists. Therefore, in this embodiment, not-georeferenced tracing measurements are associated by default with outdoor-indoor transitions (or, more generally, with indoor measurements).

According to an embodiment, the identification of the outdoor-indoor transitions (or, more generally, of the indoor measurements) comprises determining, for each stationary tracing measurement sequence, that the respective user device has experienced an outdoor-indoor transition (or, more generally, that the respective user device has performed the indoor measurements) if, for that stationary tracing measurement sequence, at least one not-georeferenced tracing measurement (e.g., at least one not-georeferenced power measurement) exists, and if the not-georeferenced tracing measurement (e.g., the not-georeferenced power measurement) is in a predefined relationship with a reference measurement (e.g., a reference power measurement). Therefore, in this embodiment, the not-georeferenced tracing measurements are not associated by default with outdoor-indoor transitions (or, more generally, with indoor measurements): the identification of the outdoor-indoor transitions (or, more generally, of the indoor measurements) also based on a predefined relationship between the not-georeferenced tracing measurement and the reference measurement allows excluding that not-georeferenced tracing measurements be erroneously associated with outdoor-indoor transitions (or, more generally, with indoor measurements)—indeed, in practical scenarios, not-georeferenced tracing measurements may also arise when the user devices are in outdoor environments, for example due to shielding of surrounding buildings or obstacles.

According to an embodiment, the identification of the outdoor-indoor transitions (or, more generally, of the indoor measurements) is based on a comparison between the tracing measurements and the reference measurement (e.g., so as to identify changes in the tracing measurements attributable to indoor attenuations).

According to an embodiment, the identification of the outdoor-indoor transitions (or, more generally, of the indoor measurements) is based on a comparison between the power measurements and the reference power measurement (e.g., so as to identify changes in the power measurements attributable to building penetration loss).

According to an embodiment, the power measurements on which the identification of the outdoor-indoor transitions is based comprise the RSRP measurements, although this should not be construed limitatively.

According to an embodiment, the reference power measurement may be based on indoor expected powers. According to an embodiment, the indoor expected powers may be based on theoretical models of electromagnetic propagation, optionally taking into account physical obstacles in the propagation path provided in 3D topographic maps.

In this embodiment, the identification of the outdoor-indoor transitions (or, more generally, of the indoor measurements) may comprise determining, for each stationary tracing measurement sequence, that the respective user device has experienced an outdoor-indoor transition (or, more generally, an indoor measurement) if, for that stationary tracing measurement sequence, at least one not-georeferenced power measurement exists, and if the not-georeferenced power measurement matches or substantially matches the reference power measurement.

According to an embodiment, for each territorial pixel, the reference power measurement may be based on a respective outdoor average power (such as the outdoor average power obtained from the georeferenced tracing measurements/territorial pixels association, as discussed above in connection with action node 210) and/or on an outdoor expected power (which may for example be obtained from electromagnetic simulations). In this embodiment, the identification of the outdoor-indoor transitions (or, more generally, of the indoor measurements) may comprise determining, for each stationary tracing measurement sequence, that the respective user device has experienced an outdoor-indoor transition (or, more generally, that the respective user device has performed an indoor measurement) if, for that stationary tracing measurement sequence, at least one not-georeferenced tracing power measurement exists, and if the not-georeferenced tracing power measurement is lower (e.g., at least by a predetermined amount) than the reference power measurement (indeed, as a result of an outdoor-indoor transition, the power measurements performed in indoor environments are expected to be lower than the tracing power measurements performed in outdoor environments, e.g. due to indoor attenuations). According to an embodiment, the predetermined amount depends on an estimate of an electromagnetic attenuation due to building penetration loss.

According to an embodiment, the comparison between the not-georeferenced power measurements and the reference power measurement is performed by considering the not-georeferenced power measurements associated with the serving network cells.

According to an embodiment, the comparison between the not-georeferenced power measurements and the reference power measurement is performed by considering also the not-georeferenced power measurements associated with the adjacent network cells: in this embodiment, the identification of the outdoor-indoor transitions (or, more generally, of the indoor measurements) may comprise determining, for each stationary tracing measurement sequence, that the respective user device has experienced an outdoor-indoor transition (or, more generally, that the respective user device has performed an indoor measurement) if, for that stationary tracing measurement sequence, both not-georeferenced power measurement associated with the serving network cell and not-georeferenced power measurement associated with the adjacent network cell(s) exist, and if both the not-georeferenced power measurement associated with the serving network cell and the not-georeferenced power measurement associated with the adjacent network cell(s) are lower (e.g., at least by a predetermined amount) than the reference power measurement. Otherwise stated, in this embodiment, each outdoor-indoor tracing measurement sequence comprises at least one not-georeferenced tracing measurement associated with the serving network cell and at least one not-georeferenced tracing power measurement associated with the adjacent network cell(s) which are lower (e.g., at least by a predetermined amount) than the reference power measurement.

According to an embodiment, if the not-georeferenced tracing measurement is a tracing measurement with invalid positioning information, the reference measurement (regardless of if it is based on the indoor expected powers, on the outdoor average powers or on the outdoor expected powers) may relate to the territorial pixel to which the not-georeferenced tracing measurement is associated (i.e., the territorial pixel identified by the invalid positioning information).

According to an embodiment, if the not-georeferenced tracing measurement is a tracing measurement with no positioning information, the reference measurement (regardless of if it is based on the indoor expected powers, on the outdoor average powers or on the outdoor expected powers) may relate to the territorial pixel associated with the georeferenced tracing measurement that, in the respective tracing measurement sequence, immediately precedes the not-georeferenced tracing measurement (in which case a transition from an outdoor environment to an indoor environment would be inferred). In other words, in this embodiment, if the not-georeferenced tracing measurement is a tracing measurement with no positioning information, the reference measurement may relate to the territorial pixel corresponding to a last available valid positioning information before the not-georeferenced tracing measurement is performed.

According to an embodiment, if the not-georeferenced tracing measurement is a tracing measurement with no positioning information, the reference measurement (regardless of if it is based on the indoor expected powers, on the outdoor average powers or on the outdoor expected powers) may relate to the territorial pixel associated with the georeferenced tracing measurement that, in the respective tracing measurement sequence, immediately follows the not-georeferenced tracing measurement (in which case a transition from an indoor environment to an outdoor environment would be inferred). In other words, in this embodiment, if the not-georeferenced tracing measurement is a tracing measurement with no positioning information, the reference measurement may relate to the territorial pixel corresponding to a first available valid positioning information after the not-georeferenced tracing measurement is performed.

According to an embodiment, the method 200 comprises, for each outdoor-indoor tracing measurement sequence, and for each not-georeferenced tracing measurement of that outdoor-indoor tracing measurement sequence for which an outdoor-indoor transition (or, more generally, for which an indoor measurement) has been identified, determining the indoor location of the respective user device (action node 240).

According to an embodiment, the determination of the indoor locations is performed at the LP module 120, although this should not be construed limitatively.

According to an embodiment, the determination of the indoor locations associated with the not-georeferenced tracing measurements (and, particularly, the not-geo-referenced tracing measurements being identified as indoor measurements) comprises refining the position estimates associated with those not-georeferenced tracing measurements.

According to an embodiment, the indoor locations are determined based on the tracing measurements. According to an embodiment, the indoor locations are determined based on the time measurements, such as the TA measurements. According to an embodiment, the time measurements, such as the TA measurements, are used to refine the position estimates associated with the not-georeferenced tracing measurements.

According to an embodiment, for each outdoor-indoor tracing measurement sequence, the indoor locations are determined based on the time measurements (such as the TA measurements) associated with two or more serving network cells (indeed, due to handover, changes in the serving network cell may occur during a same communication session, and particularly as a result of outdoor-indoor transitions, and hence one or more TA measurements may be available for each not-georeferenced tracing measurement).

According to an embodiment, if three or more TA measurements are available for a not-georeferenced tracing measurement (i.e., a not-georeferenced tracing measurement identified as an indoor measurement), the indoor location of the user device having performed the not-georeferenced tracing measurement is determined according to an intersection point of the circular crowns identified by those TA measurements and by coordinates of radiating systems of the respective cellular communication equipment. According to an embodiment, the computation of the indoor location may be refined based on the power measurements (such as the RSRP measurements) around the intersection point: just as an example, such a refinement may be advantageous for cellular networks, such as cellular networks based on LTE radio access technology, in which the TA measurements have a low or relatively low level of accuracy, or may be unnecessary for cellular networks, such as cellular networks based on 5G radio access technology, in which the TA measurements have a high or relatively high level of accuracy.

According to an embodiment, if two TA measurements are available for a not-georeferenced tracing measurement (i.e., a not-georeferenced tracing measurement identified as an indoor measurement), the indoor location of the user device having performed the not-georeferenced tracing measurement is determined according to a selected one of the (two) intersection points of the circular crowns identified by those TA measurements and by coordinates of radiating systems of the respective cellular communication equipment. According to an embodiment, the selected intersection point may be the intersection point that is closer to the position estimate (i.e., the position estimate based on Enhanced Cell ID positioning technique) and/or to the average position estimate (i.e., the position estimate resulting from the smoothing technique).

According to an embodiment, if a single TA measurement is available for a not-georeferenced tracing measurement (absence of handover), the indoor location of the user device having performed the not-georeferenced tracing measurement is determined according to the average position estimate associated with that not-georeferenced tracing measurement. According to an embodiment, the average position estimates associated with the not-georeferenced tracing measurements are used to refine the position estimates associated with the not-georeferenced tracing measurements.

According to an embodiment, the indoor location of the user device having performed the not-georeferenced tracing measurement (i.e., the not-georeferenced tracing measurement identified as an indoor measurement) is determined based on the last available valid positioning information before the not-georeferenced tracing measurement has been performed. According to an embodiment, the last available valid positioning information before the not-georeferenced tracing measurement has been performed, is used to refine the position estimate associated with that not-georeferenced tracing measurement.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

For example, the system 100 may have a different structure or include equivalent components. Moreover, any component of the system 100 may be separated into several elements, or two or more components may be combined into a single element; furthermore, each component can be replicated to support the execution of the corresponding operations in parallel. It should also be noted that (unless otherwise indicated) any interaction between different components generally does not need to be continuous, and may be either direct or indirect through one or more intermediaries.

In addition, the present invention lends itself to be implemented through an equivalent method (by using similar steps, removing some steps being not essential, or adding further optional steps); moreover, the steps may be performed in different order, concurrently or in an interleaved way (at least partly).

The invention claimed is:

1. A method comprising:

receiving, via a processor and from a cellular network, a set of measurements performed by user devices connected to the cellular network;

identifying, via the processor and from among the set of measurements, a first subset that is a plurality of measurement sequences, each one of the first subset that is the plurality of measurement sequences being associated with a respective one of the user devices, each one of the first subset that is the plurality of measurement sequences comprising the measurements performed by the associated respective user device in chronological order;

for each one of the first subset that is the plurality of measurement sequences associated with the respective one of the user devices and comprising the measurements performed by the associated respective user device in the chronological order, determining, via the processor position estimates of positions taken by the associated respective user device when performing the measurements of that one of the plurality of measurement sequences;

for each one of the first subset that is the plurality of measurement sequences associated with the respective one of the user devices and comprising the measurements performed by the associated respective user device in the chronological order, determining, via the processor, an average speed estimate of the associated respective user device based on the respective position estimates;

determining, via the processor and from among the first subset that is the plurality of measurement sequences associated with the respective one of the user devices and comprising the measurements performed by the associated respective user device in the chronological order, a second subset that is first measurement sequences, the second subset that is the first measurement sequences comprising measurement sequences, among the plurality of measurement sequences, for which the respective average speed estimates of the associated respective user devices, determined based upon the respective position estimates, are below a threshold speed;

determining, via the processor and from among the second subset that is the first measurement sequences for which the respective average speed estimates of the associated respective user devices are below the threshold speed, a third subset that is second measurement sequences, each one of the third subset that is the second measurement sequences comprising at least one indoor measurement, the at least one indoor measurement of each one of the third subset that is the second measurement sequences comprising at least one measurement, among the measurements of that one of the second measurement sequences, that is associated with no positioning information or that is associated with an invalid positioning, information; and for each of the third subset that is the second measurement sequences determined from among the first measurement sequences for which the respective average speed estimates of the associated respective user devices are below the threshold speed and comprising the at least one measurement that is associated with no positioning information or that is associated with an invalid positioning information, determining, via the processor, an indoor location associated with the respective at least one indoor measurement, said determining an indoor location comprising refining the respective position estimate associated with the at least one indoor measurement.

2. The method according to claim 1, wherein the third subset that is the second measurement sequences comprises measurement sequences, among the second subset that is the first measurement sequences for which the respective average speed estimates of the associated respective user devices are below the threshold speed, for which the at least one indoor measurement is in a predefined relationship with a reference measurement.

3. The method according to claim 2, wherein, for each of the third subset that is the second measurement sequences determined from among the second subset that is the first measurement sequences for which the respective average speed estimates of the associated respective user devices are below the threshold speed and comprising the at least one measurement that is associated with no positioning information or that is associated with an invalid positioning information, the at least one indoor measurement comprises an indoor measurement associated with a serving network cell.

4. The method according to claim 3, wherein, for each of the third subset that is the second measurement sequences determined from among the second subset that is the first measurement sequences for which the respective average speed estimates of the associated respective user devices are below the threshold speed and comprising the at least one measurement that is associated with no positioning information or that is associated with an invalid positioning information, the at least one indoor measurement further comprises a set of indoor measurements, each one of the set of indoor measurements associated with a respective adjacent network cell being adjacent to the serving network cell.

5. The method according to claim 2, wherein said reference measurement is based on at least one among:

indoor expected powers determined based on theoretical models of electromagnetic propagation;

outdoor average powers determined based on located measurements, among said set of measurements performed by the user devices, that are associated with valid positioning information; and outdoor expected powers determined based on electromagnetic simulations.

6. The method according to claim 1, wherein said determining an average speed estimate is based on a smoothing technique, and the smoothing technique is based on Kalman filtering, low-pass filtering, or a moving average.

7. The method according to claim 1, wherein, for each one of the first subset that is the plurality of measurement sequences associated with the respective one of the user devices and comprising the measurements performed by the associated respective user device in the chronological order, the threshold speed for determining the second subset that is the first measurement sequences depends on at least one of an accuracy of the respective position estimates or a duration of a communication session during which the respective measurements have been performed.

8. The method according to claim 1, wherein said determining position estimates is based on Enhanced Cell ID positioning techniques.

9. The method according to claim 1, wherein said set of measurements comprises timing advance measurements, and said determining an indoor location associated with the respective at least one indoor measurement is based:

on said timing advance measurements when the at least one indoor measurement is associated with two or more timing advance measurements, of on an average position estimate resulting from a smoothing of the respective position estimate when the at least one indoor measurement is associated with a single timing advance measurement.

10. The method according to claim 1, wherein said determining an indoor location of the respective at least one indoor measurement is based on a last available valid positioning information before the at least one indoor measurement has been performed.

11. The method according to claim 1, wherein said identifying, among the set of measurements, the first subset that is the plurality of measurement sequences is based on:

International Mobile Subscriber Identity numbers associated with the user devices, or at least one of session identifiers or Temporary Mobile Subscriber Identity associated with the user devices.

12. The method according to claim 1, further comprising, based on the determined indoor locations, at least one of:

providing quality-of-service maps for indoor environments within a geographic area of the cellular network, or setting one or more parameters of the cellular network by exploiting Self-Organizing Network functionalities of the cellular network.

13. A location processing apparatus, comprising:

a processor configured to:

receive, from a cellular network, a set of measurements performed by user devices connected to the cellular network;

identify, among the set of measurements, a first subset that is a plurality of measurement sequences, each one of the first subset that is the plurality of measurement sequences being associated with a respective one of the user devices, each one of the first subset that is the plurality of measurement sequences comprising the measurements performed by the associated respective user device in chronological order;

for each one of the first subset that is the plurality of measurement sequences associated with the respective one of the user devices and comprising the measurements performed by the associated respective user device in the chronological order, receive, from the cellular network, position estimates of positions taken by the associated respective user device when performing the measurements of that one of the plurality of measurement sequences;

for each one of the first subset that is the plurality of measurement sequences associated with the respective one of the user devices and comprising the measurements performed by the associated respective user device in the chronological order, determine an average speed estimate of the associated user device based on the respective position estimates;

determine, among the first subset that is the plurality of measurement sequences associated with the respective one of the user devices and comprising the measurements performed by the associated respective user device in the chronological order, a second subset that is first measurement sequences, the second subset that is the first measurement sequences comprising measurement sequences, among the plurality of measurement sequences, for which the respective average speed estimates of the associated respective user devices, determined based upon the respective position estimates, are below a threshold speed;

determine, among the second subset that is the first measurement sequences for which the respective average speed estimates of the associated respective user devices are below the threshold speed, a third subset that is second measurement sequences, each one of the third subset that is the second measurement sequences comprising at least one indoor measurement, the at least one indoor measurement of each one of the third subset that is the second measurement sequences comprising at least one measurement, among the measurements of that one of the second measurement sequences, that is associated with no positioning information or that is associated with an invalid positioning information, information;

for each of the third subset that is the second measurement sequences determined from among the first measurement sequences for which the respective average speed estimates of the associated respective user devices are below the threshold speed and comprising the at least one measurement that is associated with no positioning information or that is associated with an invalid positioning information, determine an indoor location associated with the respective at least one indoor measurement, said determining an indoor location comprising refining the respective position estimate associated with the at least one indoor measurement.

14. A system comprising the location processing apparatus and the cellular network of claim 13.

15. The method according to claim 1, wherein said refining the position estimate comprises:

identifying circular crowns based on three or more timing advance measurements; and determining an intersection point of the circular crowns.

16. The method according to claim 1, wherein said refining the respective position estimate comprises applying a smoothing technique to the position estimates to determine an average position estimate, and the smoothing technique is based on Kalman filtering, low-pass filtering, or a moving average.

17. The method according to claim 1, wherein said refining the position estimate comprises:

identifying two intersection points of circular crowns defined by two timing advance measurements; and selecting the intersection point of the two intersection points that is closest to a center of gravity of a serving network cell.

18. The method according to claim 1, wherein said refining the position estimate comprises determining the indoor location based on a last available valid positioning information recorded in a second measurement sequence of the third subset that is the second measurement sequences prior to the at least one indoor measurement.

19. The method according to claim 1, wherein said refining the position estimate comprises:

identifying an intersection point of circular crowns defined by timing advance measurements; and evaluating power measurements within a geographic area surrounding the intersection point to identify a refined location.

20. The method according to claim 1, wherein said refining the position estimate comprises:

associating timing advance measurements with physical coordinates of radiating systems of cellular communication equipment; and determining intersection points of circular crowns based on the physical coordinates and the timing advance measurements.

* * * * *